W. H. DOPP.
METHOD OF TREATING FILTERING ELEMENTS AND FILTERED LIQUID.
APPLICATION FILED NOV. 3, 1906.

966,177.

Patented Aug. 2, 1910.

3 SHEETS—SHEET 2.

Witnesses:
Richard Sommer
Louis W. Gratz

William H. Dopp,
Inventor.
by Geyer & Dopp
Attorneys

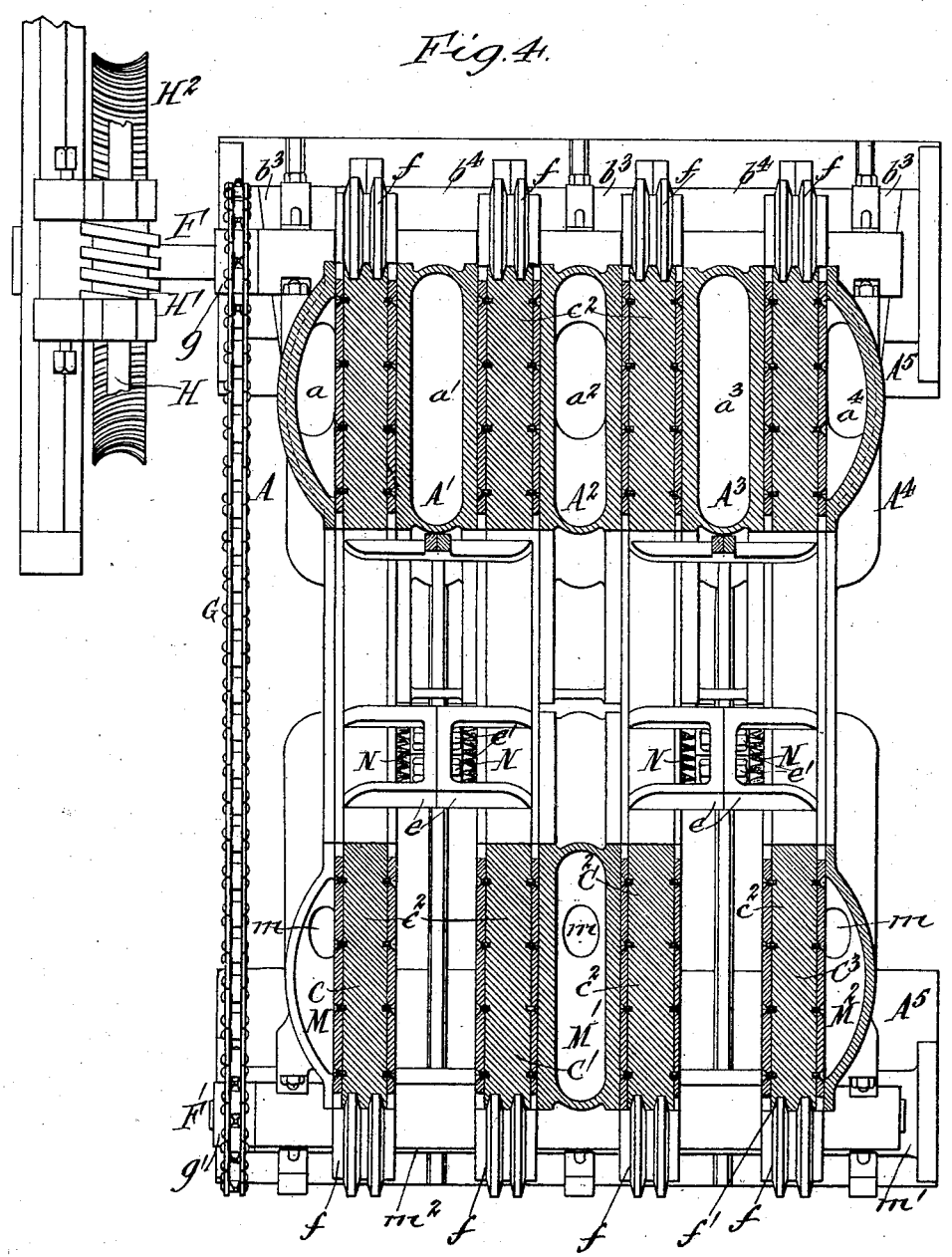

UNITED STATES PATENT OFFICE.

WILLIAM H. DOPP, OF BUFFALO, NEW YORK.

METHOD OF TREATING FILTERING ELEMENTS AND FILTERED LIQUID.

966,177. Specification of Letters Patent. Patented Aug. 2, 1910.

Original application filed November 3, 1904, Serial No. 231,297. Divided and this application filed November 3, 1906. Serial No. 341,928.

*To all whom it may concern:*

Be it known that I, WILLIAM H. DOPP, a citizen of the United States, residing at Buffalo, in the county of Erie and State of New York, have invented a new and useful Improvement in Methods of Treating Filtering Elements and Filtered Liquid, of which the following is a specification.

This invention relates to a method of cleansing and sterilizing or aerating the filtering elements of filters, and of aerating, sterilizing or bleaching the filtered liquid.

This application is a division of an application for improvements in pressure filters filed by me November 3, 1904, Serial No. 231,297.

The object of my present invention is the provision of an inexpensive and efficient method of the character above mentioned.

It consists essentially, in expelling the contained liquid from the filtering element by a suitable gaseous purifying or sterilizing agent passed through it in a direction opposite to that of entry of the unfiltered liquid, and then interposing the element thus charged or filled with the gaseous agent between the opposing liquid supply and discharge chambers of a filter, whereby the liquid entering the element forces the gas ahead of itself into the filtered liquid in the delivery chamber.

Figure 1:
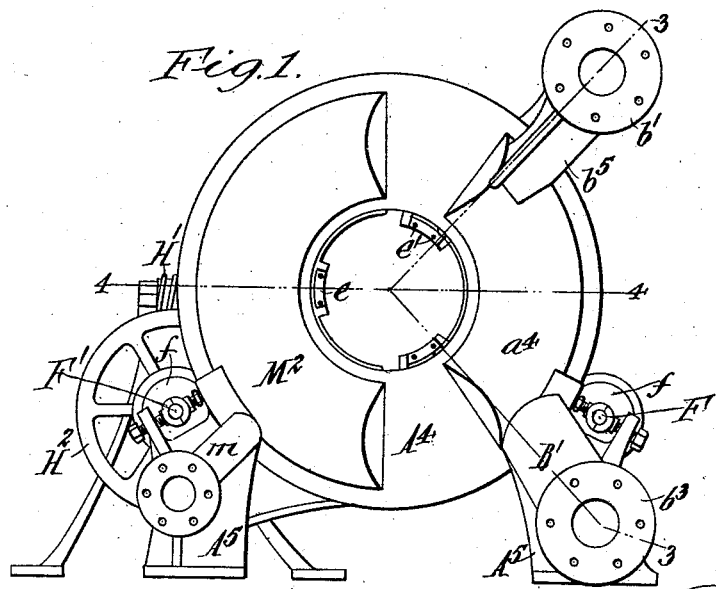
Figure 2:
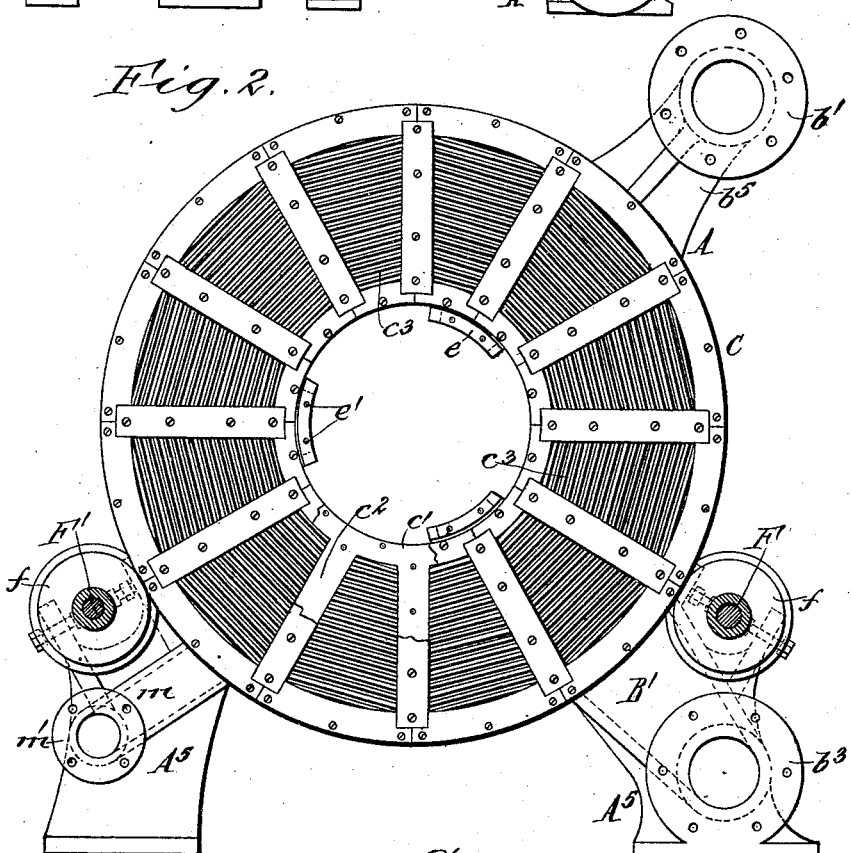
Figure 3:
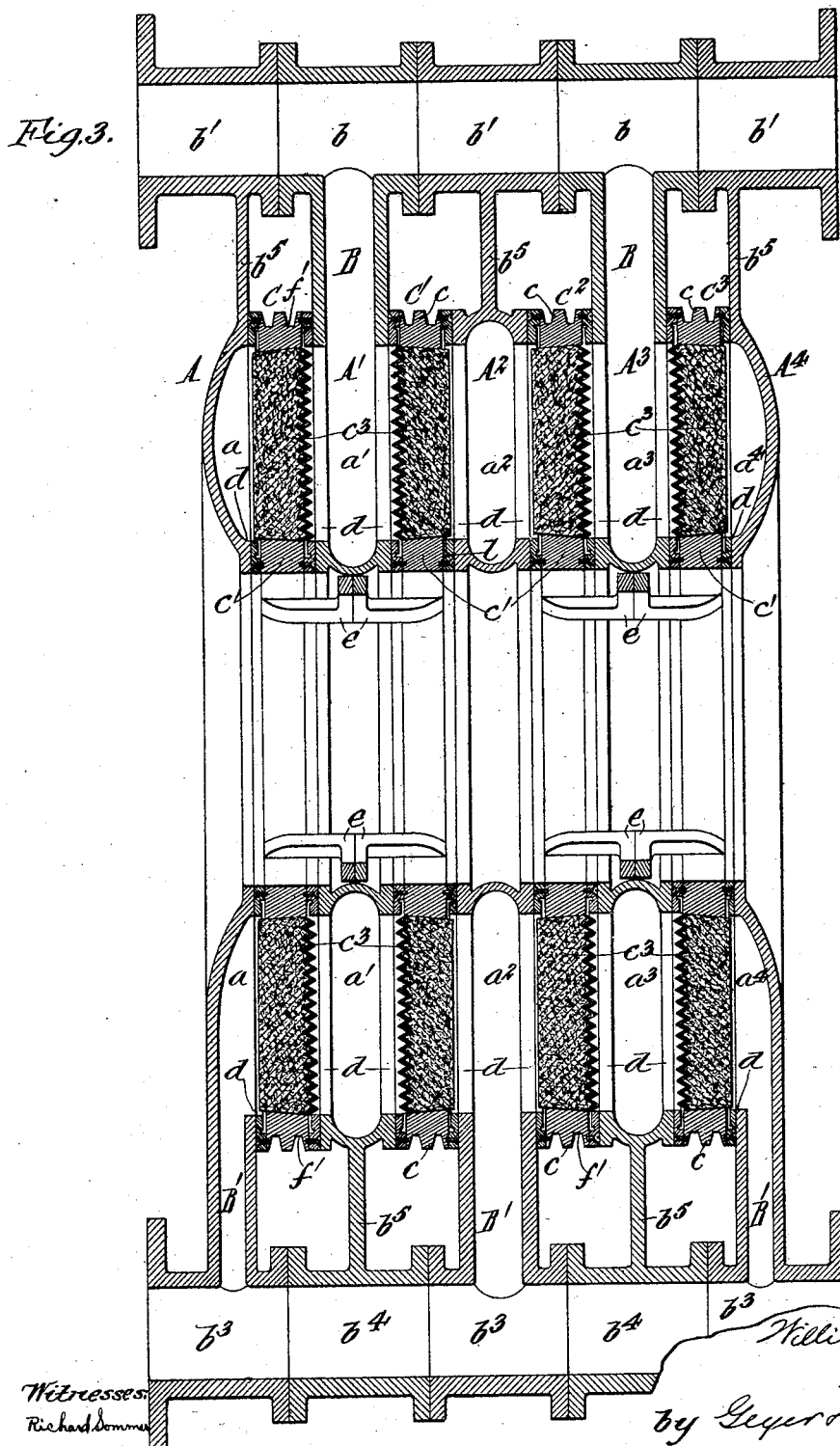

In the accompanying drawings consisting of 3 sheets: Figure 1 is a side elevation of a pressure filter by which the improved method may be practiced. Fig. 2 is a transverse section thereof. Fig. 3 is a longitudinal section in line 3—3, Fig. 1, on an enlarged scale. Fig. 4 is a horizontal section in line 4—4, Fig. 1, on an enlarged scale.

Similar letters of reference indicate corresponding parts throughout the several views.

Referring to the drawings, the body or casing of the apparatus comprises a series of upright sections A, $A^1$, $A^2$, $A^3$, $A^4$, arranged side by side and provided with feet or standards $A^5$ which support the apparatus. The end sections A, $A^4$ and the middle section $A^2$ are circular, while the intermediate sections $A^1$, $A^3$ are semi-circular. The end sections contain segmental delivery or filtered-liquid chambers $a$, $a^4$, respectively, which are closed on their outer sides and open on their inner sides and extend around about one-third of the sections. The sections $A^1$, $A^3$ next to the end sections are provided with segmental inlet or supply chambers $a^1$, $a^3$ for the raw or unfiltered liquid, and the central section $A^2$ is provided with a similarly-shaped delivery chamber $a^2$, these alternating supply and delivery chambers being arranged in line with one another, as shown in Figs. 3 and 4. The supply chambers $a^1$, $a^3$ are provided at their upper ends with inlet branches B, while the delivery chambers $a$, $a^2$ and $a^4$ are provided at their lower ends with discharge branches $B^1$. The inlet branches of the supply chambers are provided with alined transverse nipples $b$ and the delivery chambers are provided at their upper ends with corresponding nipples $b^1$ registering with the nipples $b$ and forming therewith a continuous supply main, the contiguous flanges of the nipples being suitably secured together. The branches $B^1$ of the delivery chambers have similar transverse nipples $b^3$ which alternate with coinciding nipples $b^4$ at the lower ends of the supply chambers, the series of nipples being bolted or otherwise secured together and forming a continuous delivery main. The nipples $b^1$ and $b^4$ are carried by webs or blind connections $b^5$ formed on the respective sections.

Adjacent supply and delivery chambers of the apparatus are separated by movable filtering partitions or diaphragms C, $C^1$, $C^2$, $C^3$ of annular or disk form, through which the liquid percolates in passing through the apparatus. The chambers of the three intermediate sections $A^1$, $A^2$, $A^3$, are open at opposite sides, as shown at $d$, to expose the filtering partitions to the supply and delivery chambers, and the partitions are of sufficient width to close the open side of said chambers and the end delivery chambers $a$, $a^4$. The partitions thus form porous walls which alternate with the chambers and through which the liquid must percolate in passing from the supply to the delivery chambers. Each of the partitions shown in the drawings consists of a skeleton frame of metal composed of inner and outer concentric rings $c$, $c^1$ rigidly connected together by radial bars $c^2$, and blocks or elements $c^3$ of suitable filtering material seated in the sector-shaped openings of the partitions, as shown in Figs. 2 and 3. The partitions are tied together in pairs by U-shaped lugs $e$ formed on their inner rings $c^1$ and bolts $e^1$ passing through the contiguous bars of the lugs, as best shown in Fig. 4. The several partitions are free to turn relatively to the adjoining chambered sections of the filter, to cause different portions of the filtering surfaces of the partitions to pass successively through or between the corresponding supply and delivery chambers, about one-third of such surface being always within said chambers and the other two-thirds outside thereof.

In the construction shown in the drawings the filtering partitions are slowly and continuously rotated by flanged friction wheels $f$ mounted on horizontal shafts $F$, $F^1$ and engaging with annular grooves $f^1$ formed in the periphery of the partitions. These shafts are supported in bearings on the standards $A^5$ and caused to turn in unison by a sprocket chain G running around sprocket wheels $g$, $g^1$ secured to the shafts. A slow rotary motion is transmitted from the driving shaft H to one of the shafts $F$, $F^1$ by intermediate worm gearing $H^1$, $H^2$ or other suitable means.

Opposite the liquid supply and delivery chambers $a$, $a^4$, the end and middle sections A, $A^2$, $A^4$ of the filter are provided with segmental aerating, ozonizing, sterilizing or bleaching chambers M, $M^1$, $M^2$ to the action of which the filtering partitions C, $C^3$ are subjected while outside of the supply and delivery chambers in accordance with my improved method. These sterilizing chambers are similar in form to the opposing delivery chambers A, $A^2$, $A^4$ and extend from about the top to the bottom of the sections, as shown in Fig. 1. The end chambers M, $M^2$ are closed on their outer sides and open on their inner sides, so that the backs or delivery sides of the opposing filtering partitions form the inner walls thereof, while the central chamber $M^1$ is open at both sides so that the backs or delivery sides of the central filtering partitions are exposed to the interior of the chamber. Each of these sterilizing chambers is provided with an inlet branch $m$ for supplying ozone, steam or any other suitable sterilizing, purifying or bleaching agent under pressure to the chambers. This sterilizing agent is forced into and through the filtering partitions from their delivery toward their entry or supply sides, displacing the liquid contained in the pores of the partitions, and when the traveling partitions so charged with the gaseous agent again enter between the supply and delivery chambers, the liquid from the supply chambers in permeating the filtering partitions forces the ozone or other gas ahead of it in the form of minute bubbles into the delivery chambers, thereby ozonizing or sterilizing the filtered liquid. The inlet branches of the ozonizing chambers are provided with transverse nipples $m^1$ which alternate with similar nipples $m^2$, so as to form a continuous supply main similar to the supply and delivery mains of the filtering chambers.

The spaces between the portions of the filtering partitions outside the supply and delivery chambers are open to the atmosphere, as shown in Fig. 4, and in these spaces are arranged brushes N or other cleaning devices which act upon the opposing faces of the filtering partitions, so as to remove any impurities adhering thereto.

The filtering medium may consist of any suitable material and constructed in any ordinary manner.

From the foregoing, it will be understood that about one third of the surface of each filtering partition is always interposed between the corresponding supply and delivery chambers and about one-half of each partition is outside of said chambers and opposite the corresponding sterilizing chamber and the cleaning appliances.

When liquid is forced into the supply main $b$, $b^1$, it enters the supply chambers $a^1$, $a^3$ and passes through the portions of the filtering partitions C—$C^3$ located between said chambers and the delivery chambers $a$, $a^2$, $a^4$, into the latter chambers and thence into the delivery main $b^3$, $b^4$. The filtering partitions are slowly rotated, say at the rate of about four revolutions per hour, in such a direction that they enter between the chambers at the top and leave the same at the bottom. When the filtering elements or surfaces arrive opposite the aerating or sterilizing chambers M, $M^1$, $M^2$ the air, steam, ozone or other desired agent under pressure therein forces the contained liquid out of said elements, in a direction opposite to that of entry. By this method, a most effectual cleansing of the filtering elements is accomplished, for as soon as the liquid is expelled from the same, their pores are further cleansed by the flow of air or other medium used. Only filtered liquid comes in contact with the body of the element during this cleansing operation, and only so much of the filtered liquid as is in the body of the element is used, thus effecting a great saving of the same. The air or other agent may be allowed to blow through the element for any desired length of time, so as to thoroughly aerate and sterilize the body thereof. When the filtering element again enters between the supply and delivery chambers of the apparatus and is brought into action, not only will the liquid on entering the element force ahead of itself the greater portion of the gaseous contents of the element into the already filtered liquid in the delivery chambers, and thus sterilize the same, as hereinbefore described, but the filtration will take place largely through a sterilizing medium formed by a thin layer of gas which persistently adheres to the walls of the pores.

As is well known, carbon, especially in the form of charcoal, has the property of condensing many times its own volume of gases upon its surfaces; and in order to increase the above-described sterilizing effect, carbon or material combined with carbon is preferably used for the filtering element.

In this improved method, the entry sides of the filtering elements are free and not in contact with a body of water or otherwise subjected to the pressure or resistance of such a body. The cleansing of the elements can therefore be effected with a smaller quantity of liquid and with less head or pressure. Furthermore, the adhering particles or impurities when once dislodged cannot fall back upon the filter bed or element.

I claim as my invention:

1. The hereindescribed method of aerating, sterilizing or bleaching a filtered liquid which consists in displacing the liquid in a filtering element by forcing a suitable aerating, sterilizing or bleaching agent into the same at its delivery side, and then interposing the element between the opposing liquid supply and delivery chambers of the filter, whereby the liquid entering the element forces said agent ahead of itself into the filtered liquid in the delivery chamber, substantially as set forth.

2. The hereindescribed method of aerating, sterilizing or bleaching a filtered liquid which consists in employing a carbonaceous filtering element and displacing the liquid in the same by forcing a suitable aerating, sterilizing or bleaching agent into the element at its delivery side, and then interposing the element between the opposing liquid supply and delivery chambers of the filter, whereby the liquid entering the element forces said agent ahead of itself into the filtered liquid in the delivery chamber, substantially as set forth.

Witness my hand this 30th day of October, 1906.

WILLIAM H. DOPP.

Witnesses:
C. F. GEYER,
E. M. GRAHAM.